US011875046B2

(12) United States Patent
Helmick

(10) Patent No.: US 11,875,046 B2
(45) Date of Patent: Jan. 16, 2024

(54) SYSTEMS AND METHODS FOR STORAGE DEVICE RESOURCE MANAGEMENT

(71) Applicant: Samsung Electronics Co., Ltd., Suwon-si (KR)

(72) Inventor: Daniel Lee Helmick, Broomfield, CO (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/230,853

(22) Filed: Apr. 14, 2021

(65) Prior Publication Data

US 2022/0253227 A1 Aug. 11, 2022

Related U.S. Application Data

(60) Provisional application No. 63/146,448, filed on Feb. 5, 2021.

(51) Int. Cl.
*G06F 3/06* (2006.01)
*G06F 9/455* (2018.01)

(52) U.S. Cl.
CPC .......... *G06F 3/0631* (2013.01); *G06F 3/0604* (2013.01); *G06F 3/067* (2013.01); *G06F 9/45558* (2013.01); *G06F 2009/45583* (2013.01)

(58) Field of Classification Search
CPC ...... G06F 3/0631; G06F 3/0604; G06F 3/067; G06F 9/45558; G06F 2009/45583
See application file for complete search history.

(56) References Cited

U.S. PATENT DOCUMENTS

| | | | |
|---|---|---|---|
| 10,417,156 B2 | 9/2019 | Hsu et al. | |
| 11,422,731 B1* | 8/2022 | Potashnik | G06F 3/0643 |
| 2016/0004551 A1* | 1/2016 | Terayama | G06F 9/45558 |
| | | | 718/1 |
| 2017/0235507 A1* | 8/2017 | Sinha | G06F 11/2069 |
| | | | 711/114 |
| 2020/0028911 A1* | 1/2020 | Sun | G06F 3/067 |
| 2020/0065290 A1 | 2/2020 | Natu | |
| 2020/0192718 A1 | 6/2020 | Jia | |
| 2020/0228990 A1 | 7/2020 | Xu et al. | |
| 2020/0274863 A1 | 8/2020 | Way | |
| 2020/0326891 A1 | 10/2020 | Luo et al. | |
| 2020/0327084 A1 | 10/2020 | Choudhary et al. | |
| 2021/0011864 A1 | 1/2021 | Guim Bernat et al. | |
| 2021/0117360 A1* | 4/2021 | Kutch | G06F 9/5083 |

* cited by examiner

*Primary Examiner* — Masud K Khan
(74) *Attorney, Agent, or Firm* — Lewis Roca Rothgerber Christie LLP

(57) ABSTRACT

A method includes sending an enumeration of a resource unit of the computing device to a first computing system tenant and to a second computing system tenant. The enumeration is sent through a first protocol and indicating a managing protocol associated with managing the resource unit. The method further includes receiving a first request from the first computing system tenant to reserve the resource unit. The first request is received through the managing protocol. The method further includes receiving a second request from the second computing system tenant to reserve the resource unit. The second request is received through the managing protocol. The method further includes sending, to the second computing system tenant, an indication that the resource unit is reserved by the first computing system tenant. The indication is sent through the managing protocol.

20 Claims, 15 Drawing Sheets

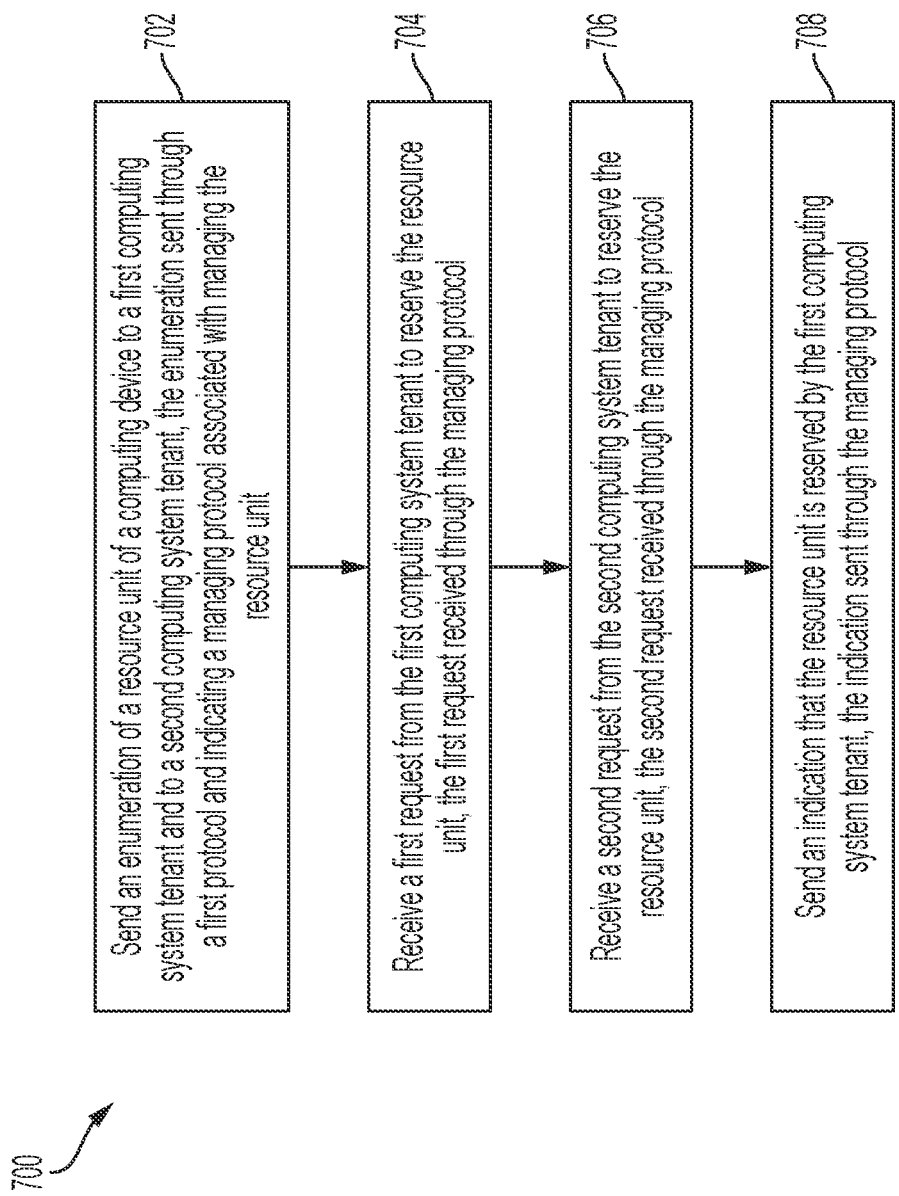

SYSTEMS AND METHODS FOR STORAGE DEVICE RESOURCE MANAGEMENT

CROSS-REFERENCE TO RELATED APPLICATION(S)

The present application claims priority to and the benefit of U.S. Provisional Application No. 63/146,448, filed Feb. 5, 2021, entitled "NVME RESOURCE MANAGEMENT ON CXL," the entire contents of all which is incorporated herein by reference.

FIELD

The present disclosure generally relates to systems and methods for storage device resource management.

BACKGROUND

Some storage devices are shared by multiple tenants. However, multiple tenants accessing a particular resource of a storage device may lead to inconsistencies. For example, if a first tenant stores a value "A" in a first storage location and a second tenant stores a value "B" in the first storage location, a result of the first tenant reading from the first storage location may not be certain.

The above information disclosed in this Background section is only for enhancement of understanding of the background of the disclosure and therefore it may contain information that does not constitute prior art.

SUMMARY

In various embodiments, described herein include systems, methods, and apparatuses for storage device resource management.

A method includes sending an enumeration of a resource unit of the computing device to a first computing system tenant and to a second computing system tenant. The enumeration is sent through a first protocol and indicating a managing protocol associated with managing the resource unit. The method further includes receiving a first request from the first computing system tenant to reserve the resource unit. The first request is received through the managing protocol. The method further includes receiving a second request from the second computing system tenant to reserve the resource unit. The second request is received through the managing protocol. The method further includes sending, to the second computing system tenant, an indication that the resource unit is reserved by the first computing system tenant. The indication is sent through the managing protocol.

A computing device includes a storage device and a processing unit. The storage device is configured to send an enumeration of a resource unit of the storage device to a first computing system tenant and to a second computing system tenant. The enumeration is sent through a first protocol and indicates a managing protocol associated with managing the resource unit. The processing unit is configured to receive a first request from the first computing system tenant to reserve the resource unit. The first request received through the managing protocol. The processing unit is further configured to receive a second request from the second computing system tenant to reserve the resource unit. The second request is received through the managing protocol. The processing unit is further configured to send, to the second computing system tenant, an indication that the resource unit is reserved by the first computing system tenant. The indication is sent through the managing protocol.

A system includes a host processor including a first tenant and a second tenant. The system further includes a device including a storage device and a processing unit. The storage device is configured to send an enumeration of a resource unit of the storage device to the first tenant and to the second tenant. The enumeration is sent through a first protocol and indicates a managing protocol associated with managing the resource unit. The first tenant is configured to send a first request to reserve the resource unit to the processing unit through the managing protocol. The second tenant is configured to send a second request to reserve the resource unit to the process unit through the managing protocol. The processing unit is configured to receive the first request. The processing unit is further configured to receive the second request. The processing unit is further configured to send, to the second tenant, an indication that the resource unit is reserved by the first computing system tenant. The indication is sent through the managing protocol.

BRIEF DESCRIPTION OF THE DRAWINGS

The above-mentioned aspects and other aspects of the present techniques will be better understood when the present application is read in view of the following figures in which like numbers indicate similar or identical elements:

FIG. 1A depicts enumeration of a resource unit.

FIG. 7 is a flowchart illustrating a method for managing resources of a storage device.

Figure 1A:
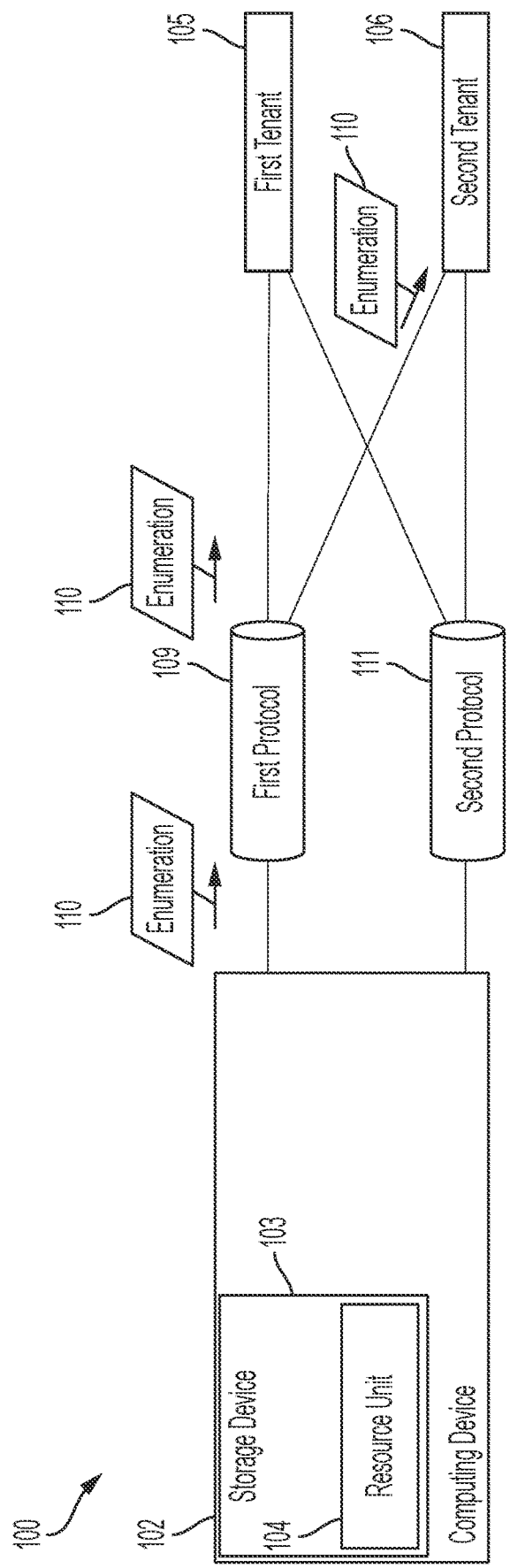
FIG. 1A is a block diagram of a system for managing resources of a storage device.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF DRAWINGS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Referring to FIG. 1A, a block diagram depicting a system 100 for storage device resource management is shown. The system 100 includes a computing device 102, a first tenant 105, and a second tenant 106. The computing device 102 includes one or more processor units (not shown). The one or more processor units may include one or more central processor units (CPUs), one or more application specific integrated circuits (ASICs), one or more field programmable gate arrays (FPGAs), one or more other processor units, or a combination thereof. The computing device 102 includes a storage device 103. The storage device 103 includes computer readable storage (not shown), such as flash memory (e.g., a solid state drive), a hard disk drive, some other type of computer readable storage, or a combination thereof. In some examples, the storage device 103 corresponds to a computational storage device. Such a computational storage device includes a processor unit (e.g., a central processor unit, a field programmable gate array (FPGA), an application-specific integrated circuit, or a combination thereof configured to perform operations on data stored in the computer readable storage of the storage device 103. While the storage device 103 is depicted as a component within the computing device 102, it should be noted that in some examples, the storage device 103 is the computing device 102. Actions attributed to the computing device 102 may be performed by the storage device 103, by one or more processor units external to the storage device 103, or a combination thereof in various implementations.

The storage device 103 includes a resource unit 104. The resource unit 104 may correspond to a portion of the computer readable storage of the storage device 103, one or more capabilities provided by the processor unit of the storage device 103 (in the example of a computational storage device), or a combination thereof. The resource unit 104 may include a namespace (NS), a portion of a NS, an entire drive resource, a resource defined by the non-volatile memory express (NVMe) standard, or a combination thereof. A NS may be indicated by a logical block address (LBA) range and may correspond to a computational NS, a key-value NS, a zoned NS, or some other type of NS. A portion of a NS may correspond to an LBA range, one or more computational program slots, one or more computational capabilities, or a combination thereof. Examples of computational capabilities include an encryption engine, a compression engine, etc. Examples of NVMe definitions include, an endurance group, an NVM set, a media unit, a submission queue, a domain, assignable device interface (ADI), process address space identifier (PASID), a proportion of SSD performance capability, etc.

While resource units related to NVMe SSDs are described above and throughout, in other examples, the storage device 103 may be an advanced host controller interface (AHCI) SSD, an NVMe hard disk drive (HDD), etc. Further, it should be noted that in some implementations, resources of a different type of device (e.g., other than a storage device may be managed according to the disclosed techniques) For example, the storage device 103 may be replaced by a graphics processor unit (GPU), a network interface controller (NIC), or other device.

The first tenant 105 may correspond to a computing device, a computing device component, software executed by a computing device, or a combination thereof that is configured to access data stored at the storage device 103, manage data stored at the storage device 103, write data to the storage device 103, or a combination thereof. Examples of computing device components that may correspond to the first tenant 105 include central processor units (CPUs), CPU cores, graphics processor units (GPUs), Tensor Processing Units (TPUs), Computational Storage Accelerators, NICs, etc. Examples of software executed by a computing device that may correspond to the first tenant 105 include Operating Systems, hypervisors, user applications, virtual machines, etc. Similarly, the second tenant 106 may correspond to a computing device, a computing device component, software executed by a computing device, or a combination thereof. It should be noted that the first tenant 105 and the second tenant 106 may correspond to software and/or hardware components of the same computing device or may be implemented in different computing devices. Further, while two tenants are shown, the system 100 may include a different number of tenants configured to interact with data of the storage device 103. While illustrated external to the computing device 102, the first tenant 105 and the second tenant 106 may be internal to the computing device 102. For example, the computing device 102 may be a computing device that includes one or more components that correspond to and/or execute the first tenant 105 and the second tenant 106.

The computing device 102 is configured to communicate with the first tenant 105 and the second tenant 106 through a first protocol 109 and a second protocol 111. While not illustrated, the computing device 102 may include one or more interfaces configured to transmit signals according to the first protocol 109 and the second protocol 111. In some implementations, a single interface of the computing device 102 is configured to support both the first protocol 109 and the second protocol 111. For example, a U.2, U.3, EDSFF connector, Add-In-Card (AIC), or an M.2 connector may support both the first protocol 109 and the second protocol 111. The first protocol 109 and the second protocol 111 may be implemented over the same physical layer or different physical layers. In some examples, both the first protocol 109 and the second protocol 111 are implemented over peripheral component interconnect express (PCIe) physical layer. In some implementations, the first protocol 109 and the second protocol 111 are sub-protocols of a single protocol (e.g., compute express link (CXL)). The second protocol 111 may be a cache management protocol (e.g., CXL.cache, CXL.mem, etc.) over which the computing device 102 distributes cache lines. The cache lines may identify which tenants have access to which resource units of the storage device 103.

The computing device 102 is configured to enumerate resource units available at the storage device 103 and to provide access to the resource units over the first protocol 109. The computing device 102 is further configured to manage reservations of resource units over the second protocol 111. Because reservation of resource units is handled near the storage device (e.g., at the computing device 102), reservation may be faster as compared to other techniques for reserving resource units. Further, because reservation is handled through a different protocol than memory access operations, memory access operations may not be blocked by reservation operations. That is messages received through the first protocol 109 (e.g., memory access operations) may be processed at the computing device 102 concurrently with messages received through the second protocol 111 (e.g., reservation requests). In some implementations the computing device 102 is configured to maintain coherence between first protocol 109 messages and second protocol 111 messages. For example, the computing device 102 may introduce a delay in processing of first protocol 109 messages so that memory access requests are not handled based on out of date reservation data.

In some examples, a zero in a specific cache (e.g., CXL.cache) address location may be used to mean a resource unit is available to be claimed. A reservation request may come in on the second protocol 111 (e.g., CXL.cache) from the first tenant 105. This reservation request may cause the computing device 102 to compare a cached value for the resource unit to 0. If the compare to 0 is successful, the computing device 102 may write a value of 1 to signal to other tenants that the resource unit is being used by the first tenant 105. If the compare to 0 fails, the first tenant 105 may receive a failed status for the compare and write. This failed operation signals a failed reservation of the resource.

In another example, the second tenant 106 may use the first protocol 109 (e.g., CXL.io and NVMe). The first protocol 109 may provide a standardized or vendor unique linking mechanism. This first protocol 109 may request an NVMe storage device to reserve the same resource unit. The reservation operation through the first protocol 109 may include an optional delay before and after while the computing device 102 implements a Compare and Write against the same field to claim the resource. The claiming of the resource unit may be returned through the NVMe interface as successful or unsuccessful. In some examples, the computing device 102 may present itself as a computing resource on one or more of the protocols 109, 111.

It should be noted that the computing system 100 may be a distributed and/or disaggregated system. For example, the computing device 102 may communicate through the first protocol 109 and the second protocol 111 over a network (e.g., a local area network, a wide area network, etc.). In some implementations, the computing device 102 is connected to the first tenant 105 and to the second tenant 106 through the Internet.

In the example of FIG. 1A, the computing device 102 sends an enumeration 110 over the first protocol 109 to the first tenant 105 and the second tenant 106. In some examples, the enumeration 110 corresponds to a standardized enumeration, such as a PCIe or CXL enumeration. The enumeration 110 identifies the resource unit 104. For example, the enumeration 110 may indicate a NS identifier, a LBA range, an engine identifier, a slot identifier, some other identifier, or a combination thereof. In addition, the enumeration 110 may identify the second protocol 111 as the protocol assigned to handling reservations of the resource unit 104. It should be noted that the storage device 103 may include further resource units in addition to the resource unit 104. The enumeration 110 may identify these further resource units as well. Alternatively, the further resource units may be identified by further enumerations sent by the computing device 102 over the first protocol 109.

Figure 1B:
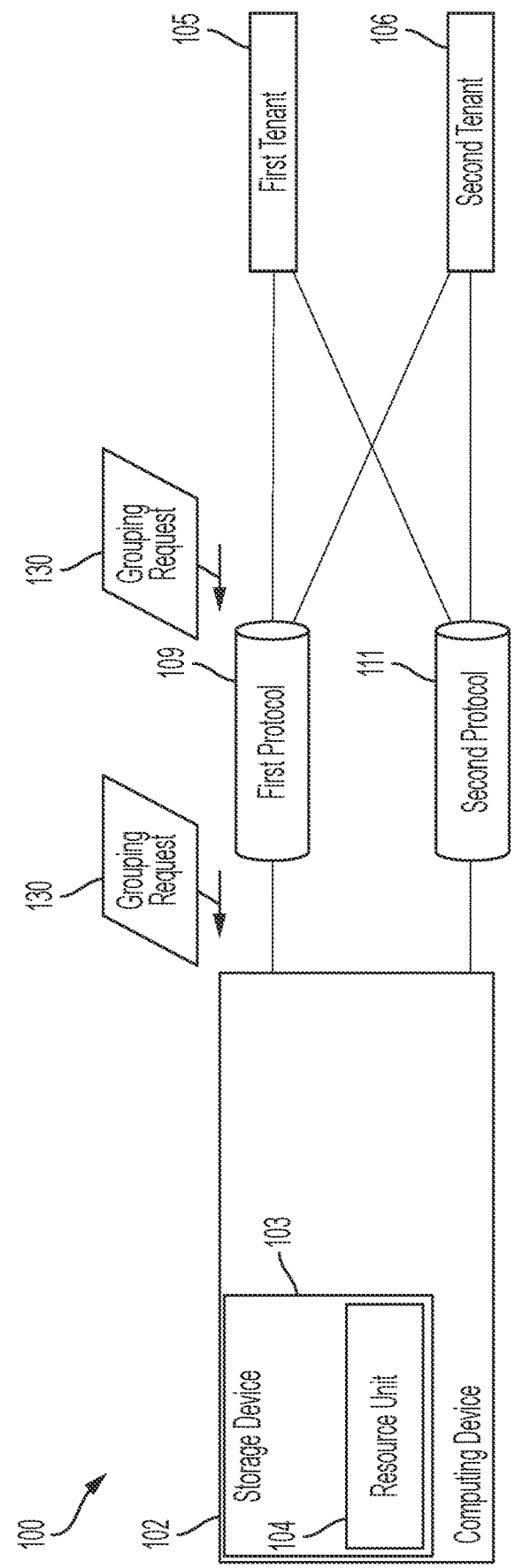
FIG. 1B is a block diagram depicting the system for managing resources of the storage device handling a grouping request.

In some implementations, the resource unit 104 is created based on a request from one of the first tenant 105 or the second tenant 106. For example, FIG. 1B illustrates the first tenant 105 sending a grouping request 130 to the computing device 102 over the first protocol 109. For example, the grouping request may indicate one or more resources of the storage device 103 to be grouped into the resource unit 104. These resources may include one or more NS, one or more NS portions, one or more drive resources, one or more resources defined by the NVMe standard, or a combination thereof. The grouping request may include identifiers of these resources, such as one or more NS identifiers, one or more LBA ranges, one or more computational program slot identifiers, one or more computational capability identifiers, one or more endurance group identifiers, one or more NVM set identifiers, one or more media unit identifiers, one or more submission queue identifiers, one or more domain identifiers, one or more ADI identifiers, one or more PASID identifiers, one or more proportion of SSD performance capability identifiers, one or more identifiers associated with other resources, or a combination thereof. Based on the grouping request, the computing device 102 may group resources identified by the grouping request 130 into the resource unit 104 and send the enumeration 110 to the first tenant 105 and the second tenant 106 over the first protocol 109.

Figure 1C:
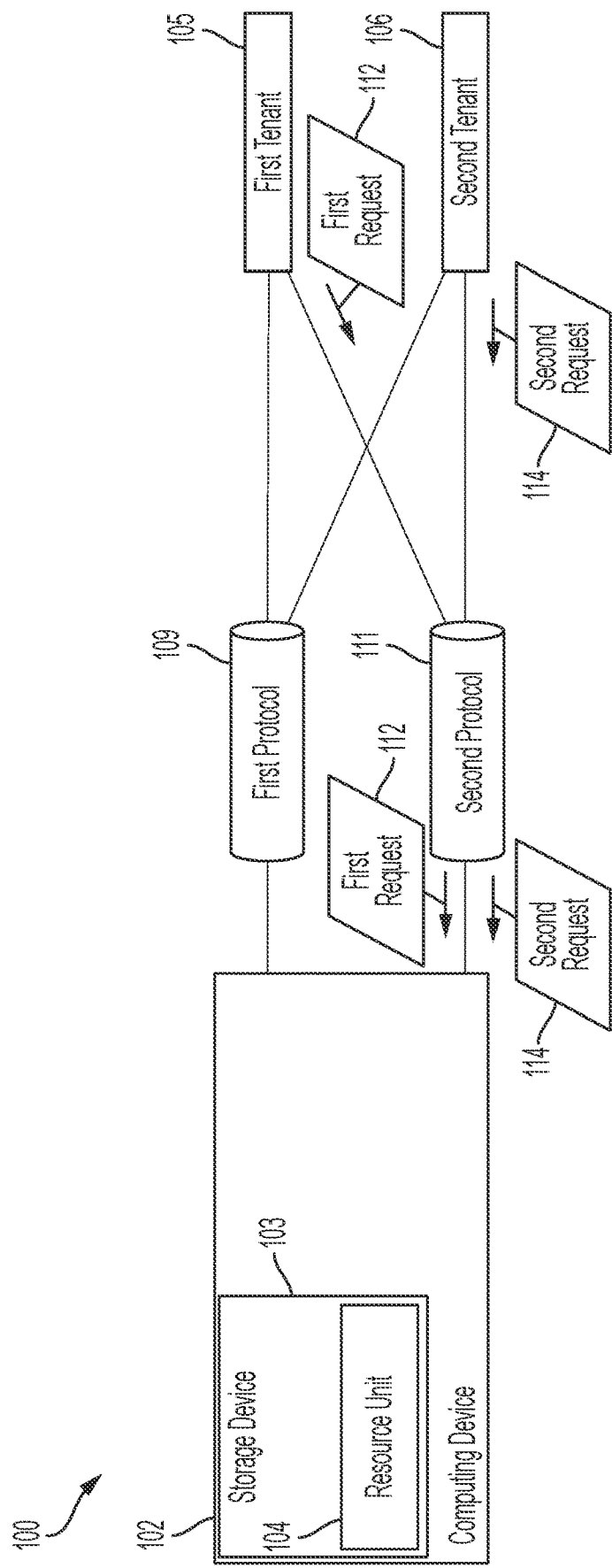
FIG. 1C is a block diagram depicting reservation requests in the system for managing resources of the storage device.
Figure 1D:
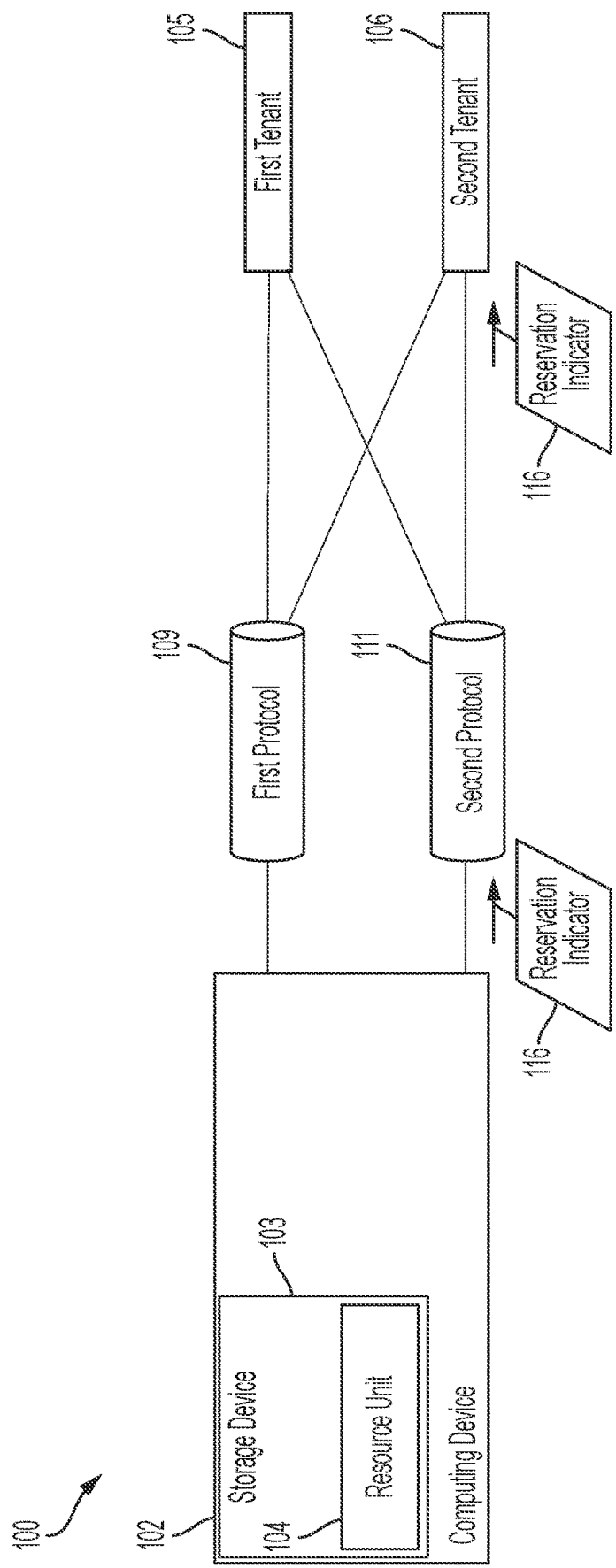
FIG. 1D is a block diagram depicting a reservation indicator in the system for managing resources of the storage device.

FIG. 1C illustrates the first tenant 105 and the second tenant 106 requesting to reserve the resource unit 104. In response to receiving the enumeration 110, the first tenant 105 sends a first request 112 for the resource unit 104 to the computing device 102 through the second protocol 111. Similarly, the second tenant 106 sends a second request 114 to the computing device 102 through a second protocol 111. The computing device 102 is configured to reserve the resource unit 104 to one of the first tenant 105 and the second tenant 106 based on the first request 112 and the second request 114. In some implementations, the computing device 102 may select a tenant based on a sequence of received requests (e.g., first come first served) however other arbitration techniques are possible. In some implementations the first request 112 (and/or the second request 114 may further define a type of access requested (e.g., read-only or read and write, etc.). Additionally, the first request 112 (and/or the second request 114) may indicate whether the requested reservation is exclusive or shared. For shared access, the first request 112 (and/or the second request 114) may indicate one or more other tenants (e.g., by identifier) and one or more associated access types (e.g., read-only or read and write, etc.). In some implementations, the computing device 102, is configured to determine whether a requested reservation is consistent with a security and/or usage policy associated with the resource unit 104. For example, access (or a particular access type) to the resource unit 104 may be restricted to one or more particular tenants. In some implementations, the enumeration 110 includes information indicating which access type or types are available for the resource unit 104. In some examples, the storage device 103 selectively sends the enumeration 110 to tenants that may access the resource unit 104 consistent with the security and/or usage policy. In some examples, the security and/or usage policy is defined in the grouping request 130.

In the illustrated example, the computing device 102 may reserve the resource unit 104 to the first tenant 105. Upon determining to reserve the resource unit 104 to the first tenant 105, the computing device 102 may store an indicator that the resource unit 104 is reserved to the first tenant 105 by setting a marker in a memory space of the computing device 102. Memory space may be accessible to the first tenant 105 and the second tenant 106 through the second protocol 111. This marker may correspond to a line of a cache within the computing device. In some examples, the cache line may further indicate a type of access reserved to the first tenant 105. Further, the cache line (or an additional cache line) may be set to indicate any other tenants that have been granted access to the resource unit 104 and what type of access has been granted. The cache may be implemented in a random access memory (RAM), or other memory, of the computing device (e.g., internal or external to the storage device 103). The computing device 102 may send a reservation indicator 116 to the second tenant 106 through the second protocol 111. The reservation indicator 116 indicates that the resource unit 104 is reserved to the first tenant 105. For example, the reservation indicator 116 may include the cache line described above. In some examples, the reservation indicator 116 is sent in response to the computing device 102 reserving the resource unit 104 to the first tenant 105. In some examples, the reservation indicator 116 is sent by the computing device 102 in response to the second request 114. In some examples, the reservation indicator 116 is sent in response to a snoop request received from the second tenant 106 through the second protocol 111. In some examples, the reservation indicator 116 is sent in response to a data access request received by the computing device 102 from the second tenant 106 through the first protocol 109. In some examples, the reservation indicator 116 is sent in response to expiration of a timer (e.g., the computing device 102 may publish cache updates through the second protocol 111 periodically). It should be noted that the computing device 102 may be configured to transmit a reservation indicator in response to more than one of the conditions described above. Further, while not shown, the computing device 102 may transmit the reservation indicator 116 to the first tenant 105 through the second protocol 111. In some implementations, the first tenant 105 and the second tenant 106 may receive different reservation indicators. For example, the first tenant 105 may receive an indication of reservation success while the second tenant 106 may receive an indication of reservation failure.

Figure 1E:
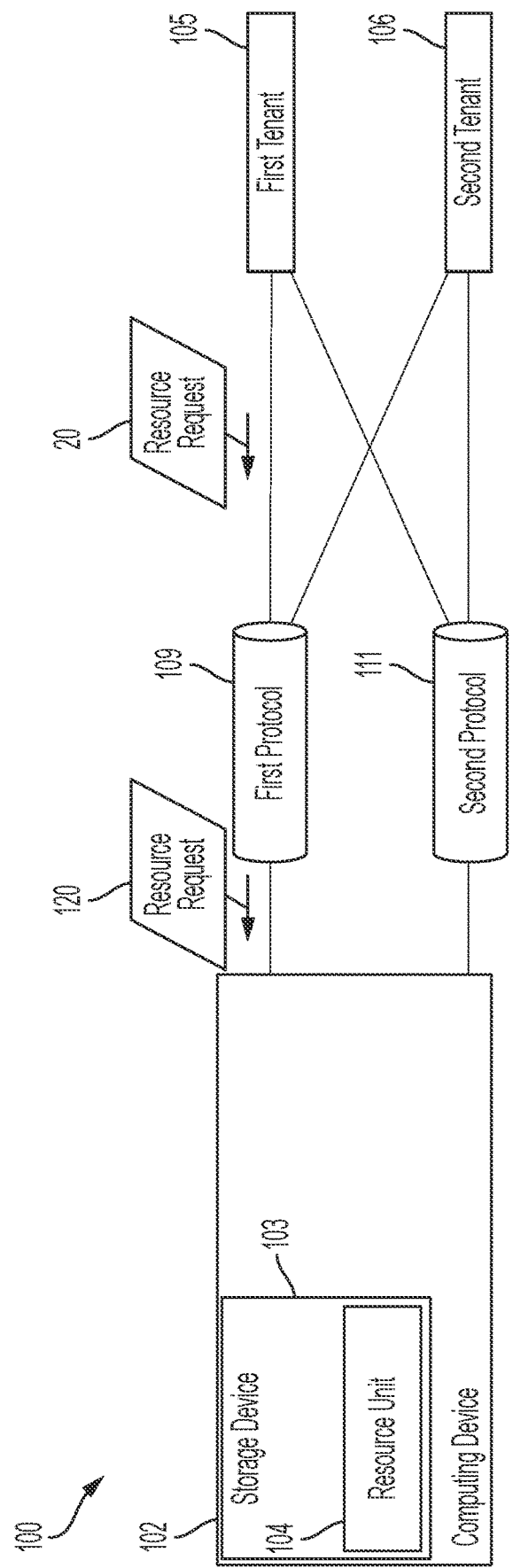
FIG. 1E is a block diagram depicting resource a request in the system for managing resources of the storage device.

As shown in FIG. 1E, the first tenant 105 may issue a resource request 120 for the resource unit 104 to the computing device 102 through the first protocol 109. This resource request 120 may correspond to an NVMe command or other command directed to the resource unit 104. In some implementations, other tenants (e.g., the second tenant 106) that have received an indication that the resource unit 104 is reserved to the first tenant 105 may refrain from sending such resource requests targeted to the resource unit 104. It should be noted that the computing device 102 may be configured to confirm that received resource requests are consistent with reservations stored (e.g., in the cache) at the computing device 102. In response to the resource request 120 being consistent with the first tenant 105 reserving the resource unit 104, the computing device 102 may access the resource unit 104 per the resource request 120 and return any result to the first tenant 105 through the first protocol 109.

Thus, the computing device 102 may manage access to the resource unit 104 near the storage device 103 using two protocols. Near storage access management may reduce delays caused by remote access control. Further, managing access over two protocols may reduce delays caused by reservation requests blocking access requests.

FIGS. 2A-2E depict an example of a system 200 for managing resources of a SSD over CXL. The system 200 may correspond to a particular example of the system 100.

The CXL protocol may enable memory extensions and coherent accelerators. In various embodiments, the disclosed systems can use a cache coherent protocol such as CXL to provide coherent caching of resource unit reservations.

In various embodiments, the disclosed systems including the management computing device can feature a smart-device architecture. In particular, the disclosed systems can feature a device that plugs onto a cache coherent interface (e.g., a CXL/PCIe interface) and can implement various cache and memory protocols (e.g., type-2 device based CXL.cache and CXL.mem protocols). Further, in some examples, the device can include a programmable controller or a processor (e.g., a RISC-V processor) that can be configured to present a storage device to tenants using a cache coherent protocol (e.g., a CXL.IO protocol).

In some examples, the disclosed systems can be programmed at least partially via ASIC circuits, FPGA units, and/or the like.

Peripheral Component Interconnect Express (PCIe) can refer to a computer interface which may have a relatively high and variable latency. CXL is an open industry standard for communications over PCIe (e.g., PCIe 5.0), which can provide fixed, relatively short packet sizes, and, as a result, may be able to provide relatively high bandwidth and relatively low, fixed latency. As such, CXL may be capable of supporting cache coherence and CXL may be well suited for making connections to memory. CXL may further be used to provide connectivity between a host and accelerators, memory devices, and network interface circuits (or "network interface controllers" or network interface cards" (NICs)) in a server.

Cache coherent protocols such as CXL may also be employed for heterogeneous processing, e.g., in scalar, vector, and buffered memory systems. CXL may be used to leverage the channel, the retimers, the PHY layer of a system, the logical aspects of the interface, and the protocols from PCIe (e.g., PCIe 5.0) to provide a cache-coherent interface. The CXL transaction layer may include three multiplexed sub-protocols that run simultaneously on a single link and can be referred to as CXL.io, CXL.cache, and CXL.mem. CXL.io may include I/O semantics, which may be similar to PCIe. CXL.cache may include caching semantics, and CXL.mem may include memory semantics; both the caching semantics and the memory semantics may be optional. Like PCIe, CXL may support (i) native widths of ×16, ×8, and ×4, which may be partitionable, (ii) a data rate of 32 GT/s, degradable to 8 GT/s and 16 GT/s, 128b/130b, (iii) 300 W (75 W in a ×16 connector), and (iv) plug and play. To support plug and play, either a PCIe or a CXL device link may start training in PCIe in Gen 1, negotiate CXL, complete Gen 1-5 training and then start CXL transactions.

NVMe protocol may be used over the CXL.io sub-protocol to provide access to an NVMe storage device. In some implementations, CXL.cache and/or CXL.mem is used to coherently manage caches of resource unit reservations and CXL.io is used to carry NVMe protocol messages (e.g., access requests, etc.)

Figure 2A:
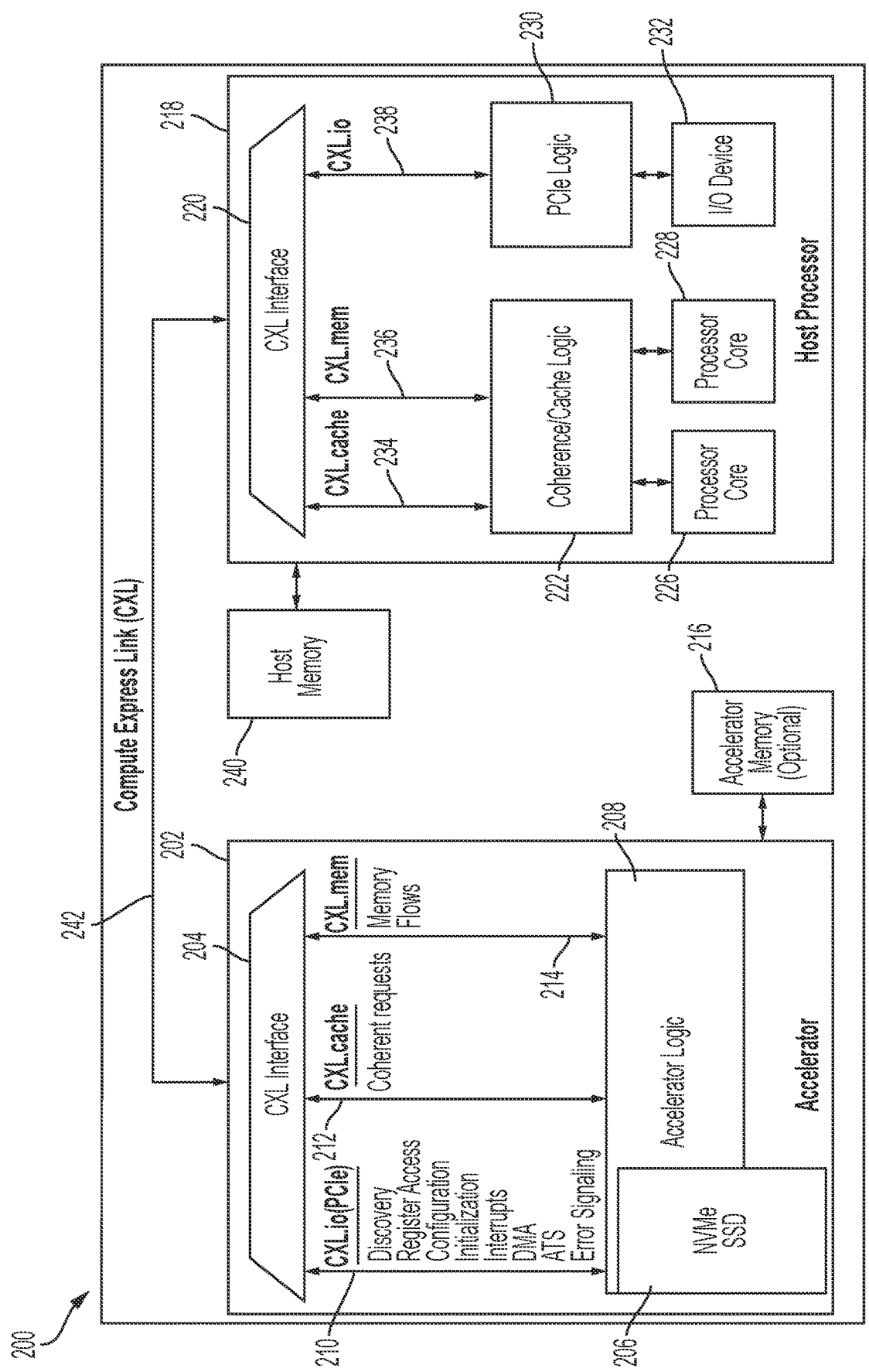
FIG. 2A depicts a diagram of a system for managing resources of a storage device over compute express link (CXL).

As shown in FIG. 2A, the system 200 includes an accelerator 202 and a host processor 218 connected by a CXL link. The accelerator 202 is a computing device and may correspond to the computing device 102 of the system 100. The accelerator 202 includes a first CXL interface 204, an NVMe SSD 206, and accelerator logic 208. The first CXL interface 204 may include hardware connector (e.g., U.2, M.2, etc.) and associated circuitry configured to separate out messages received over the CXL link 242 into a CXL.io link 210, a CXL.cache link 212, and a CXL.mem link 214. The first CXL interface 204 may further be configured to transmit messages received over the CXL.io link 210, the CXL-.cache link 212, and the CXL.mem link 214 over the CXL link 242.

The NVMe SSD 206 is connected to the CXL.io link 210, and the accelerator logic 208 is connected to the CXL.cache link 212 and the CXL.mem link 214. While only one NVMe SSD is shown, the accelerator 202 may include more than one NVMe SSD. The accelerator logic 208 corresponds to a processor unit, such as a FPGA or ASIC, that is configured to operate as described herein. It should be noted that in some implementations, the NVMe SSD 206 includes the accelerator logic 208. For example, the accelerator logic 208 may be implemented by a controller of the NVMe SSD 206.

The accelerator 202 is further connected to accelerator memory 216. In some examples, the accelerator memory 216 is internal to the accelerator 202. For example, the accelerator memory 216 may be included in the NVMe SSD 206. The accelerator memory 216 may include RAM (e.g., dynamic RAM (DRAM), static RAM (SRAM), etc.), any other type of memory, or a combination thereof.

The host processor 218 includes a second CXL interface 220. The second CXL interface 220 may include hardware connector (e.g., U.2, M.2, etc.) and associated circuitry configured to separate out messages received over the CXL link 242 into a CXL.io link 238, a CXL.cache link 234, and a CXL.mem link 236. The second CXL interface 220 may further be configured to transmit messages received over the CXL.io link 238, the CXL.cache link 234, and the CXL.mem link 236 over the CXL link 242.

A coherence/cache logic 222 of the host processor 218 is connected to the CXL.cache link 234 and to the CXL.mem link 236. A PCIe logic 230 of the host processor 218 is connected to the CXL.io link 238. The coherence/cache logic 222 may include an ASIC, an FPGA, or other processor unit configured to manage one or more caches of the host processor 218. The coherence/cache logic 222 is connected to a first processor core 226 and a second processor core 228. The first processor core 226 and the second processor core 228 may be different tenants that are configured to access the NVMe SSD 206. The coherence/cache logic 222 is configured to maintain coherent caches for the processor cores 226, 228. The first processor core 226 may correspond to the first tenant 105 and the second processor core 228 may correspond to the second tenant 106. In other examples, software executed by one or more of the processor cores 226, 228 corresponds to the first tenant 105 and the second tenant 106. Alternatively, the host processor 218 may provide access to the NVMe SSD 206 by one or more other components of a computing device (e.g., a GPU, etc.).

A PCIe logic 230 is connected to the CXL.io link 238. The PCIe logic 230 is configured to send NVMe messages to and receive NVMe messages from the NVMe SSD 206 through the CXL.io link 238. The PCIe logic 230 may correspond to an ASIC, an FPGA, or other processor unit. The PCIe logic 230 is connected to an input/output (I/O) device 232. The I/O device 232 may correspond to a memory configured to store I/O commands and results.

The host processor 218 is further connected to a host memory 240. In some examples, the host memory 240 is internal to the host processor 218. The host memory 240 may include RAM (e.g., dynamic RAM (DRAM), static RAM (SRAM), etc.), any other type of memory, or a combination thereof.

One or more components or software executed by the host processor 218 may correspond to one or more tenants (e.g., the first tenant 105 and the second tenant 106) that access the NVMe SSD 206.

Figure 2B:
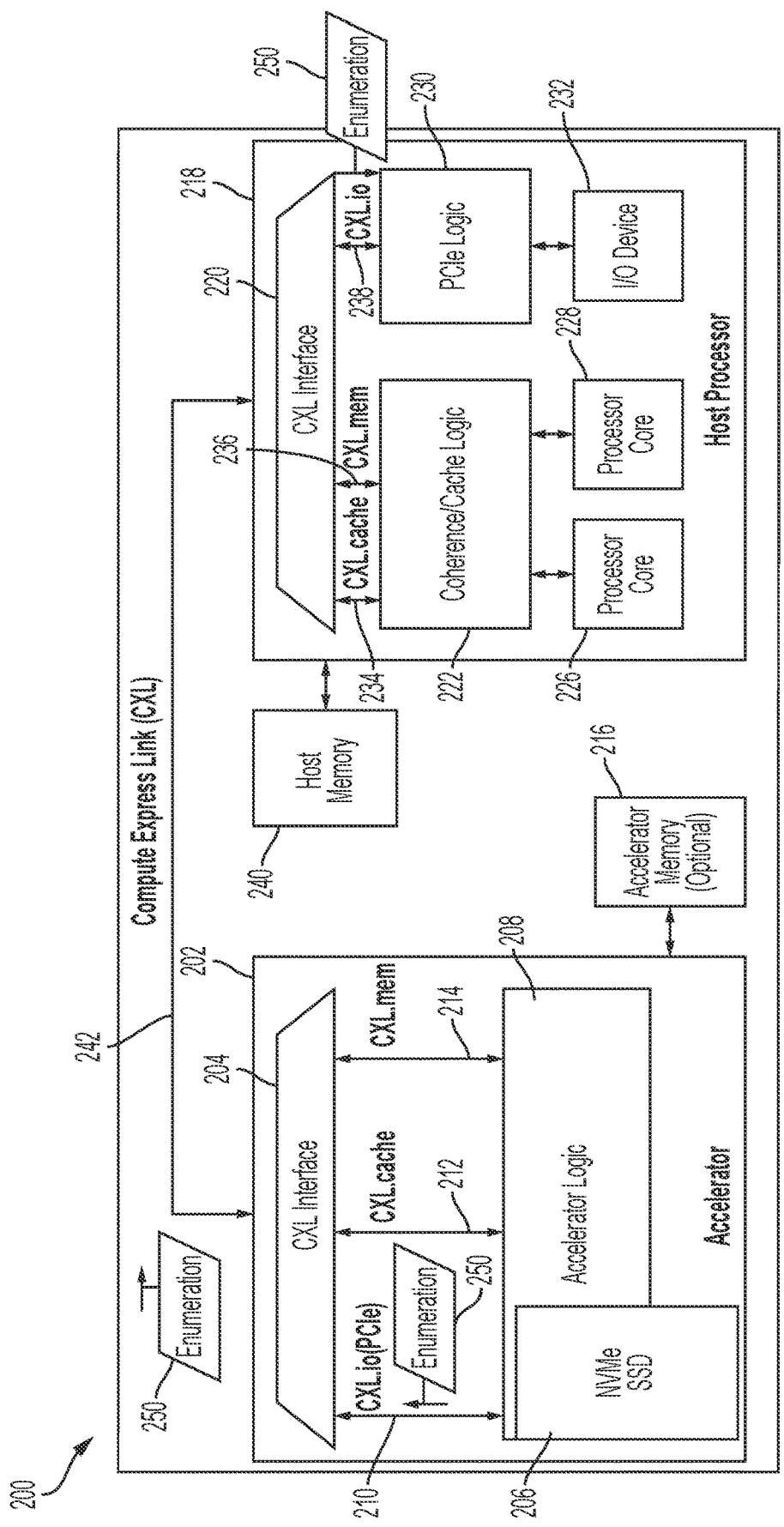
FIG. 2B depicts enumeration of a resource unit in the system for managing resources of a storage device over CXL.

In operation, the NVMe SSD 206 may send an enumeration 250 of a resource unit of the NVMe SSD to the I/O device 232 through the CXL.io link 210, the first CXL interface 204, and over the CXL link 242, as shown in FIG. 2B. In addition to identifying the resource unit, the enumeration may indicate that the resource unit is managed on CXL.cache (or CXL.mem). The I/O device 232 may receive the enumeration 250 through the second CXL interface 220 and the CXL.io link 238. One or more tenants may receive the enumeration 250 through the I/O device 232. The enumeration 250 may correspond to the enumeration 110 shown in FIG. 1A.

Figure 2C:
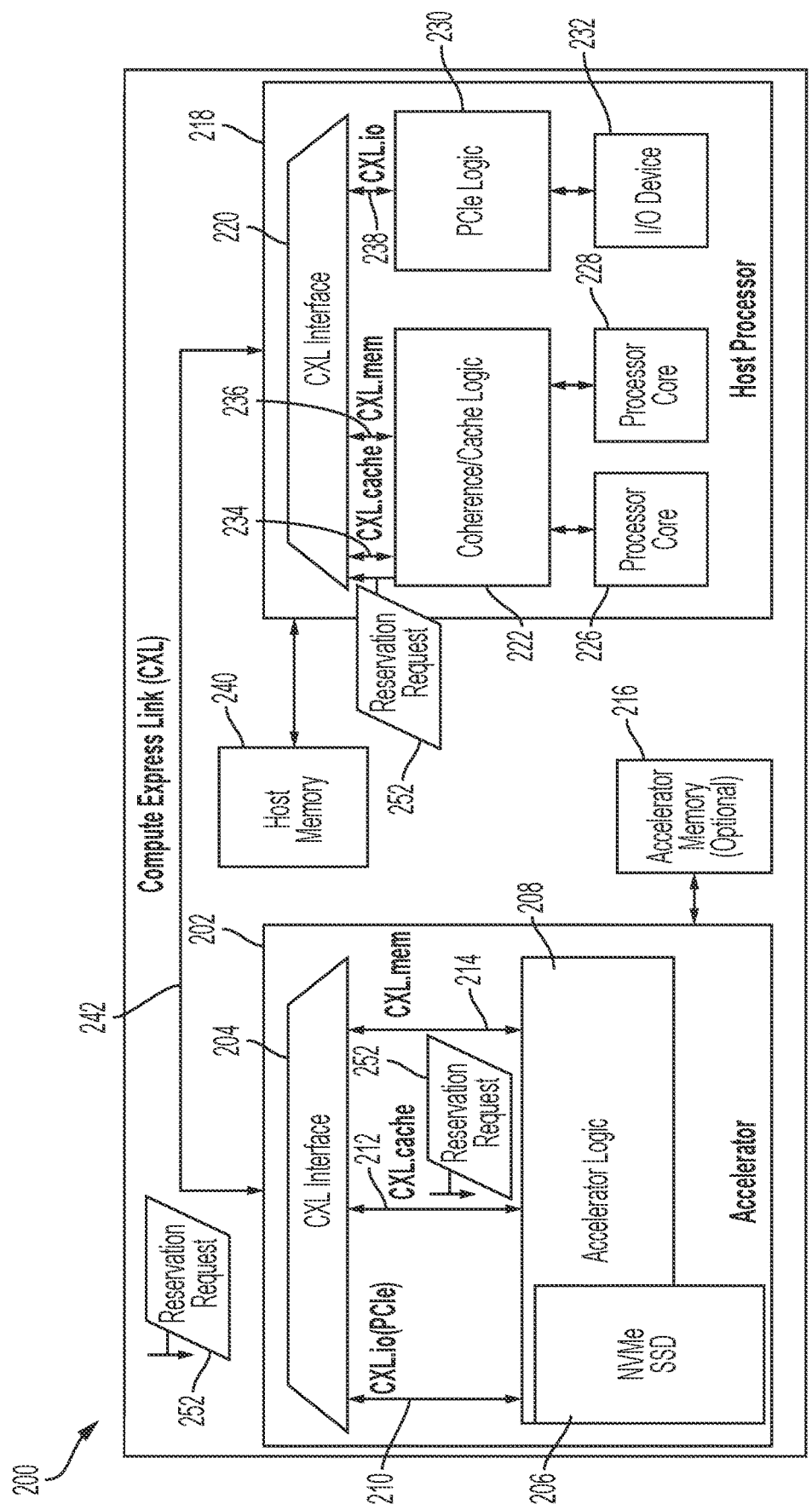
FIG. 2C depicts a reservation request in the system for managing resources of a storage device over CXL.

Referring to FIG. 2C, the processor core 228 (or the processor core 226) may initiate a request to access the resource unit indicated by the enumeration 250. The processor core 228 may send an identifier of the resource unit to the coherence/cache logic 222. The coherence/cache logic 222 may determine whether the resource unit is reserved by a tenant by looking up the resource unit in a cache (e.g., stored in the host memory 240).

In response to determining that the processor core 228 has reserved the resource unit, the processor core 228 may proceed with accessing the resource unit. Accordingly, the processor core 228 may submit an I/O request to the I/O device 232 and the PCIe logic 230 may initiate transmission of the I/O request through the CXL.io link 238.

In response to determining that the requesting tenant has been reserved by a different tenant or that the requesting tenant lacks permission for a requested access type (e.g., the cache indicates that a different tenant has access to the resource unit or the cache indicates that requesting tenant has a permission to access the resource unit that is incompatible with the I/O request), the processor core 228 may determine that the resource unit is unavailable.

In response to determining that the resource unit is available for reservation (e.g., the cache in the host memory 240 does not include an entry for the resource unit, an entry for the resource unit in the cache is dirty, an entry for the resource unit in the cache is older than a threshold, etc.), The coherence/cache logic 222 may initiate transmission of a reservation request 252 to the accelerator logic through the CXL.cache link 234.

Figure 2D:
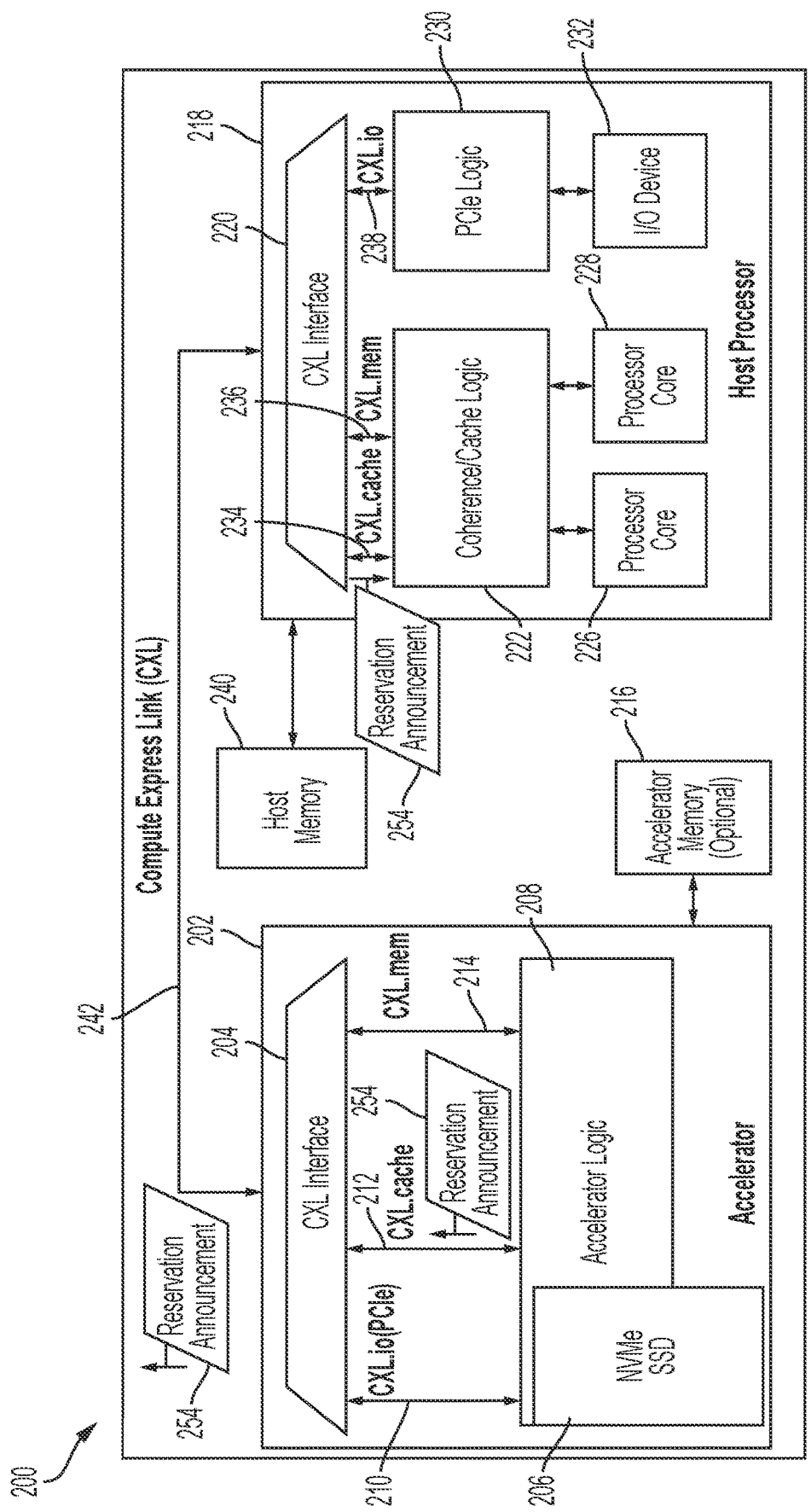
FIG. 2D depicts a reservation announcement in the system for managing resources of a storage device over CXL.

The accelerator logic 208 may receive the reservation request 252 through the CXL.cache link 212. Upon receiving the reservation request 252, the accelerator logic 208 may determine whether the requesting tenant has access to the resource unit indicated by the reservation request 252 by looking the resource unit up in a local cache (e.g., stored in the accelerator memory 216). In response to determining that the cache includes a line indicating that the resource unit is reserved by a different tenant or that the requesting tenant is granted an access type incompatible with the reservation request 252, the accelerator logic 208 may send an updated cache line for the resource unit to the host processor 218 through the CXL.cache link 212. However, in response to determining that the local cache does not include a line for the resource unit, the accelerator logic 208 may add a line to the local cache indicating that the resource unit is reserved to the requesting tenant. The accelerator logic 208 may then send an updated cache line for the resource unit to the host processor 218 through the CXL.cache link 212. FIG. 2D illustrates the accelerator logic 208 may send a reservation announcement 254 to the host processor 218 (e.g., to the second processor core 228) through the CXL.cache link 212. The reservation announcement may correspond to an updated cache line for the resource unit. In response to receiving the reservation announcement 254, the coherence/cache logic 222 may update the cache stored at the host processor 218 (e.g., in the host memory 240) by adding the cache line in the reservation announcement 254 to the cache.

The coherence/cache logic 222 may then signal the processor core 228 that the requested I/O request is allowed or disallowed based on the cache.

Figure 2E:
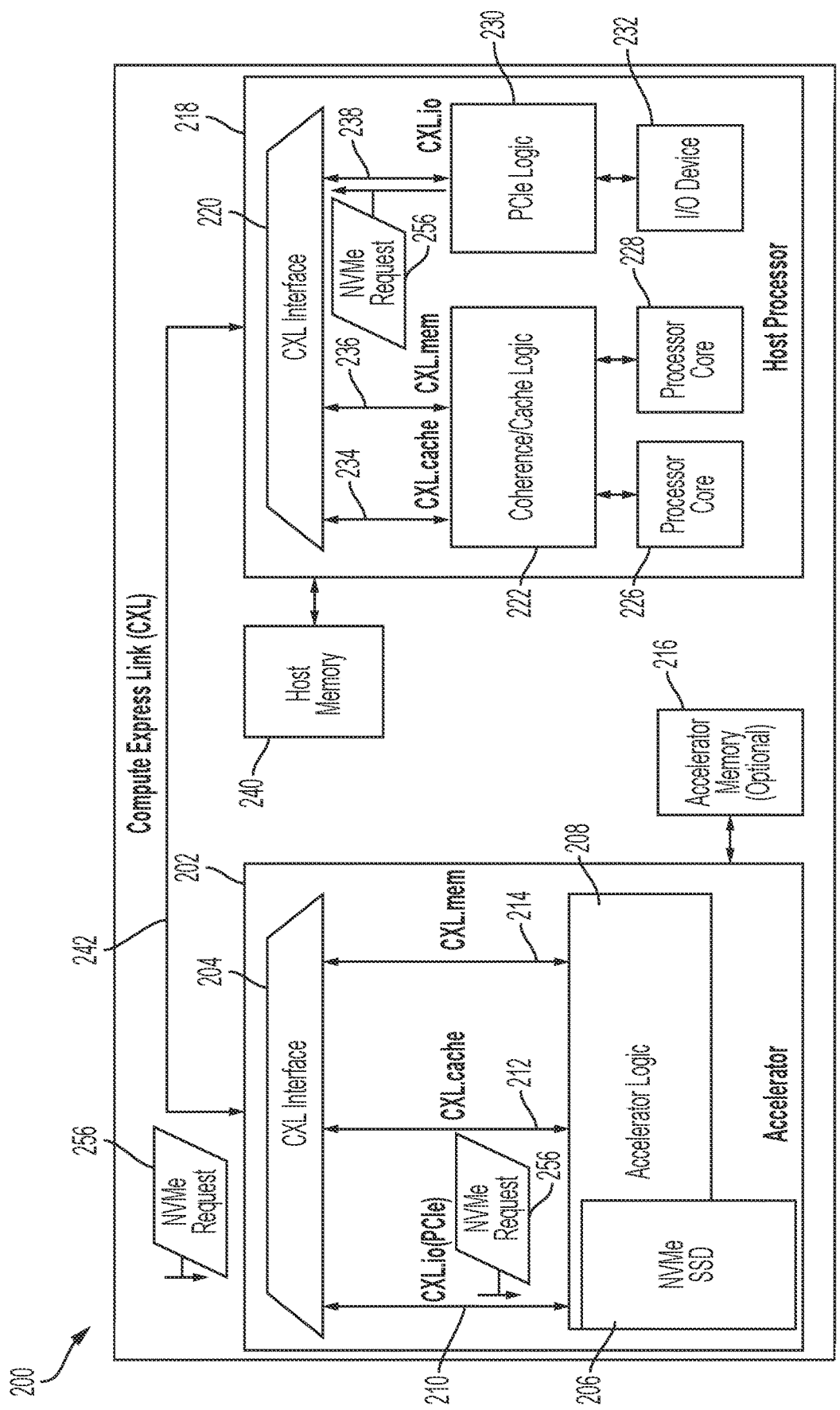
FIG. 2E depicts a non-volatile memory express (NVMe) request in the system for managing resources of a storage device over CXL.

FIG. 2E depicts an example in which the requested I/O has been allowed (e.g., the requesting tenant has received a reservation for the resource unit). In this case, the tenant submits the I/O request (e.g., NVMe request 256) to the I/O device 232. The PCIe logic 230 retrieves the NVMe request 256 from the I/O device 232 and outputs the NVMe request to the CXL.io link 238. The second CXL interface 220 transmits the NVMe request 256 over the CXL link 242 to the first CXL interface 204. The first CXL interface 204 then outputs the NVMe request 256 to NVMe SSD through the CXL.io link 210 for processing.

Thus, FIGS. 2A-2E depict that a coherent cache of resource unit reservations may be managed over CXL.cache (or CXL.mem) and I/O requests for a SSD (e.g., NVMe requests) can be selectively transmitted over CXL.io based on the reservations. Managing the cache at the accelerator 202 provides near storage access control to resource units which may be faster than other access control solutions. Further, CXL.cache (or CXL.mem) may ensure that the remote host processor's cache is coherent with the local cache of the accelerator 202.

Figure 3:
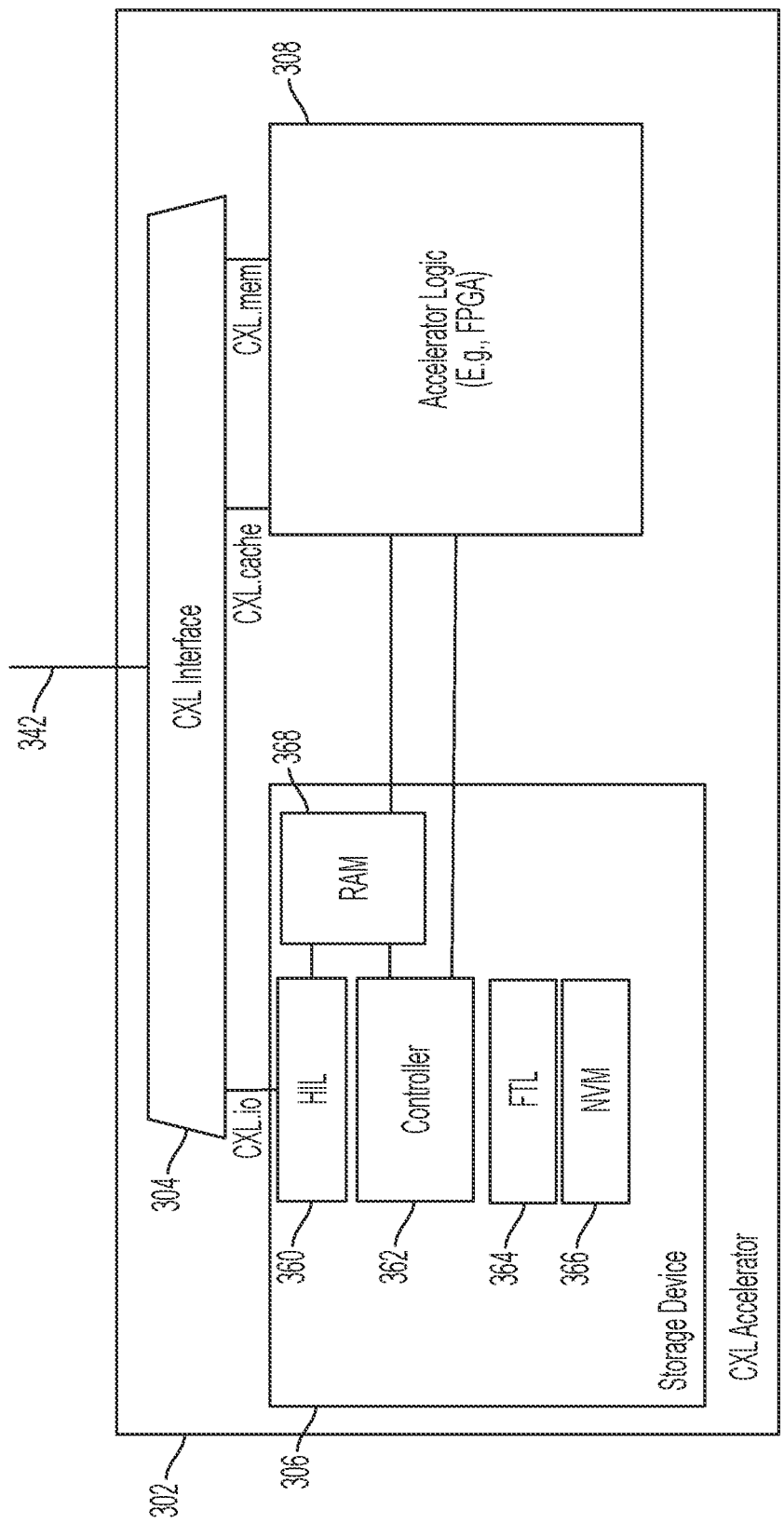
FIG. 3 depicts a first example of a CXL accelerator.

FIG. 3 depicts a particular example of a CXL accelerator. The CXL accelerator may correspond to the computing device 102 of the system 100 or to the accelerator 202 of the system 200. The CXL accelerator 302 includes a CXL interface 304 connected to a CXL link 342. The CXL interface 304 may correspond to the first CXL interface 204 and the CXL link 342 may correspond to the CXL link 242 of the system 200. The CXL accelerator 302 includes a storage device 306. The storage device 306 may correspond to the storage device 103 of the system 100 or the NVMe SSD 206 of the system 200. The storage device 306 includes a host interface layer 360, a controller 362, a flash translation layer (FTL) 364, a non-volatile memory (NVM) 366, and a RAM 368. The host interface layer (HIL) 360 may include a connector, an ASIC, an FPGA, or a combination thereof. The HIL 360 is configured to provide translation of messages between the controller 362 and a host device (not shown). The HIL 360 receives/sends CXL.io (e.g., the first protocol 109 or the CXL.io link 210) messages between the controller 362 and the CXL interface 304. The CXL.io messages may include NVMe messages. The controller 362 includes an FPGA, a CPU, an ASIC, another type of processor unit, or a combination thereof. The controller 362 is configured to control operations of the storage device 306.

The FTL 364 includes an ASIC, FPGA, a connector, or a combination thereof. The FTL 364 is configured to provide translation of messages between the controller 362 and the NVM 366 (e.g., translation of LBAs to physical block addresses). The NVM 366 includes flash memory or some other type of memory and is configured to store data.

The RAM 368 may include DRAM, SRAM, some other type of RAM, or a combination thereof. The RAM 368 may correspond to the accelerator memory 216. The RAM 368 may be configured to store a cache indicating reservations of resource units of the storage device 306.

The CXL accelerator 302 further includes an accelerator logic 308 (e.g., a FPGA, an ASIC, etc.). The accelerator logic 308 receives/sends CXL.cache and CXL.mem (e.g., the second protocol 111, the CXL.cache link 212, or the CXL.mem link 214) messages through the CXL interface 342.

The CXL accelerator 302 may enumerate resource units of the storage device 306 and receive/process I/O requests (e.g., NVMe requests) over CXL.io (e.g., a first protocol), as described above. The accelerator logic 308 may receive reservation requests and publish reservation announcements through CXL.cache or CXL.mem as described above. The accelerator logic 308 may manage a local cache of resource unit reservations stored in the RAM 368, as described above. The accelerator logic 308 may access the local cache through direct memory access (DMA) to the RAM 368 and/or by sending commands to the controller 362.

Figure 4:
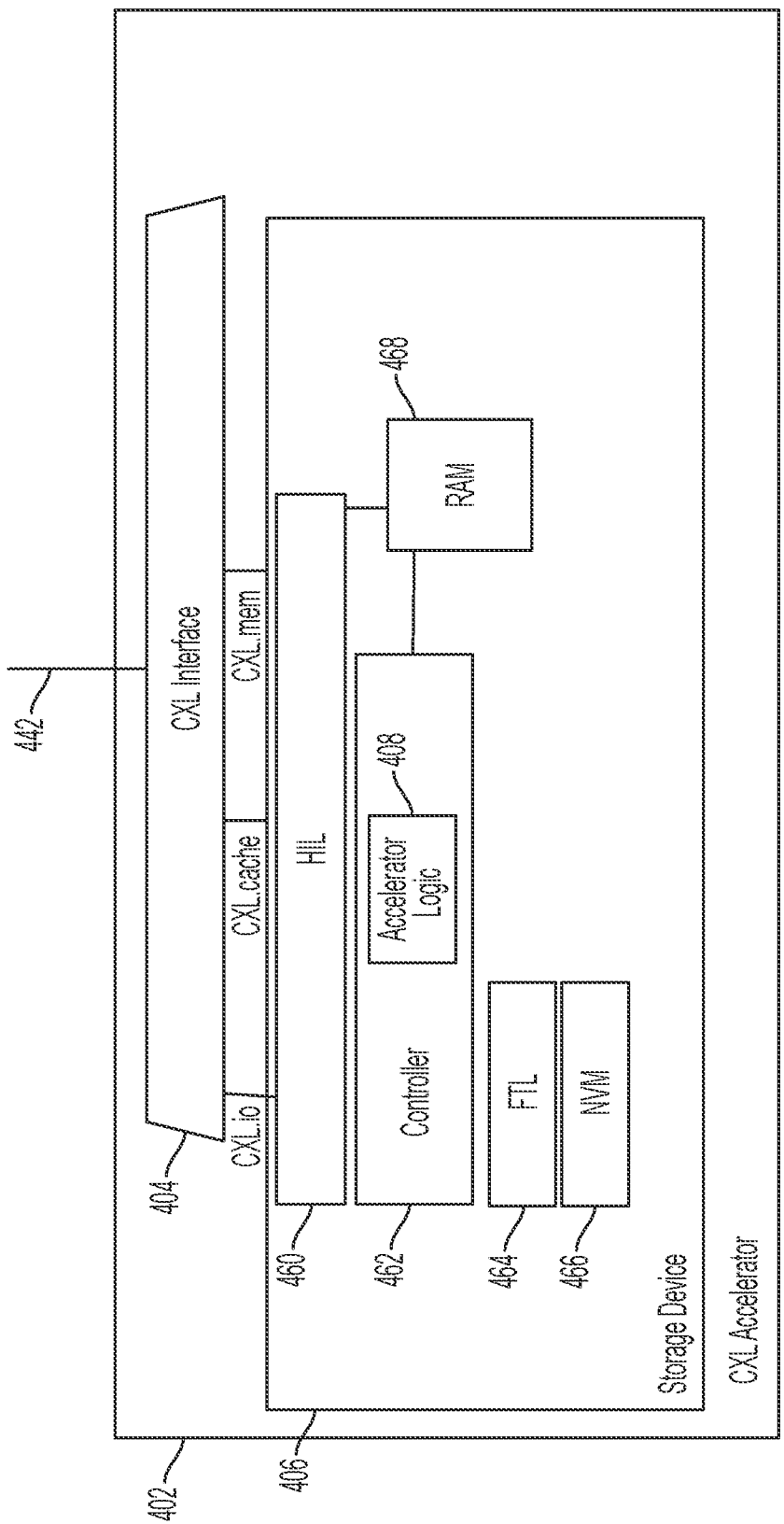
FIG. 4 depicts a second example of a CXL accelerator.

FIG. 4 depicts an alternate configuration of the CXL accelerator 302. In FIG. 4, a CXL accelerator 402 includes a CXL interface 404, a storage device 406, a HIL 460, a controller 462, an FTL 464, an NVM 466, and a RAM 468. These components correspond to components of the CXL accelerator 302. Instead of accelerator logic external to the storage device 406, the controller 462 of the storage device 406 includes accelerator logic 408. The accelerator logic 408 may correspond to an ASIC or FPGA that is a component of the controller 462 and may be configured to operate as described above with reference to the accelerator logic 308, the accelerator logic 208, and the computing device 102. In this implementation, the HIL 460 receives CXL.io, CXL.cache, and CXL.mem and routes these to the controller 462. The accelerator logic 408 receives and responds to CXL.cache and CXL.mem.

Thus, FIG. 4 depicts an alternative in which a storage device includes both a controller configured to receive and respond to I/O requests through a first protocol and logic configured to manage resource unit reservations according to a second protocol. Further variations are possible. For example, the CXL interface 404 may be a component of the HIL 460 in some implementations.

Figure 5:
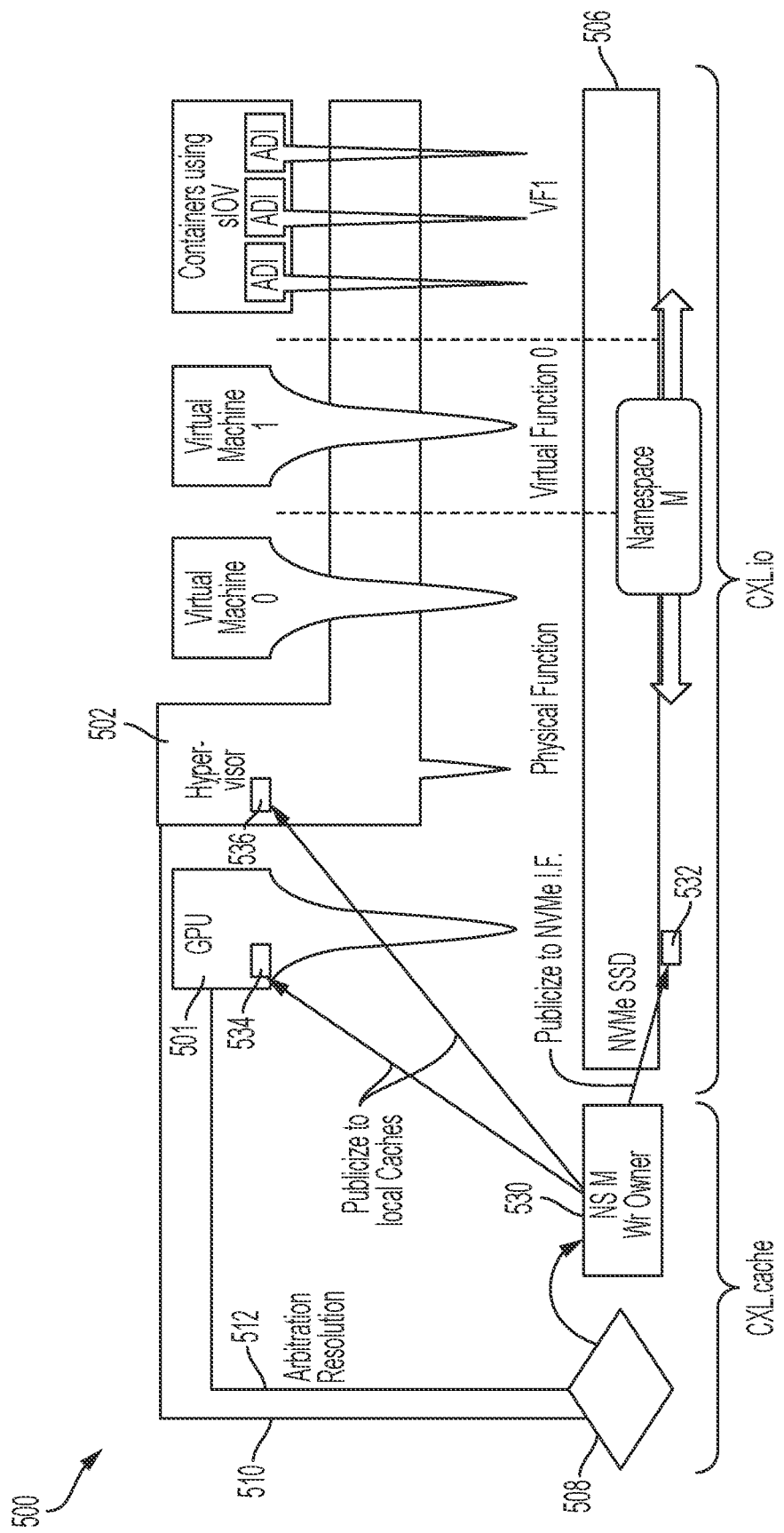
FIG. 5 depicts another example system for managing resources of a storage device.

FIG. 5 is a diagram illustrating information flow in a system 500 for managing resources of a storage device during arbitration between two tenants. The system 500 includes a GPU 501, a hypervisor 502, accelerator logic 508, and a SSD 506. The GPU 501 and the hypervisor 502 are tenants configured to access data stored on the SSD 506. The GPU 501 may correspond to the first tenant 105, a component of a computing device including the host processor 218, or both. The hypervisor 502 may correspond to the second tenant 106, software executed by the computing device including the host processor 218, or both. In the illustrated example, the hypervisor provides an abstraction layer for accesses to the SSD by two virtual machines and several ADIs. The accelerator logic 508 may correspond to an FPGA, an ASIC, another processing unit, or a combination thereof. The accelerator logic 508 may correspond to the accelerator logic 208. The SSD 506 may correspond to the storage device 103 and/or the SSD 206. The accelerator logic 508 and the SSD 506 may be components of the computing device 102 and/or the accelerator 202.

In operation, the GPU 501 sends a first arbitration resolution request 510 for write access to resource unit "NS M" to the accelerator logic 508, and the hypervisor 502 sends a second arbitration resolution request 512 for write access to NS M to the accelerator logic 508. The arbitration resolution requests 510, 512 are sent through CXL.cache. In some examples, the resource unit indicated by the arbitration resolution requests 510, 512 is enumerated by the SSD over CXL.io prior to transmission of the arbitration resolution requests 510, 512.

In response to the arbitration resolution requests 510, 512, the accelerator logic 508 determines whether to grant write access to the NS M to the GPU 501 or the hypervisor 502. In response to determining that the NS M misses in a cache 532 of the SSD 506 (e.g., in the accelerator memory 216, RAM 368, or the RAM 468) the accelerator logic 508 may determine to grant access (e.g., on a first come first served basis) to one of the GPU 501 or the hypervisor 502. Accordingly, the accelerator logic 508 may generate a cache line 530 indicating that the selected one of the GPU 501 and the hypervisor 502 has been granted write access to the NS M. The accelerator logic 508 may publish the cache line 530 to the cache 532. Further, the accelerator logic may transmit the cache line 530 to a cache 534 of the GPU (e.g., at the host memory 240) and a cache 536 (at the host memory 240) of the hypervisor 502 through CXL.io. Subsequently, the selected on of the GPU 501 and the hypervisor 502 may issue write requests for the NS M to the SSD 506 over CXL.io. It should be noted that reservation of the NS M to one of the GPU 501 and the hypervisor 502 may be contingent on a usage/security policy associated with the NS M. Such a usage/security policy may be set by a grouping request, such as the grouping request 130.

Thus, FIG. 5 illustrates an example of resource management over two protocols. Because resource management is handled close to the storage unit, delays may be reduced. Further, because separate protocols are used for resource unit access and reservation requests, reservation requests may not block resource unit access requests. In addition, because the illustrated example uses a cache coherent protocol (CXL.cache), coherent distribution of reservation information may be achieved.

Figure 6:
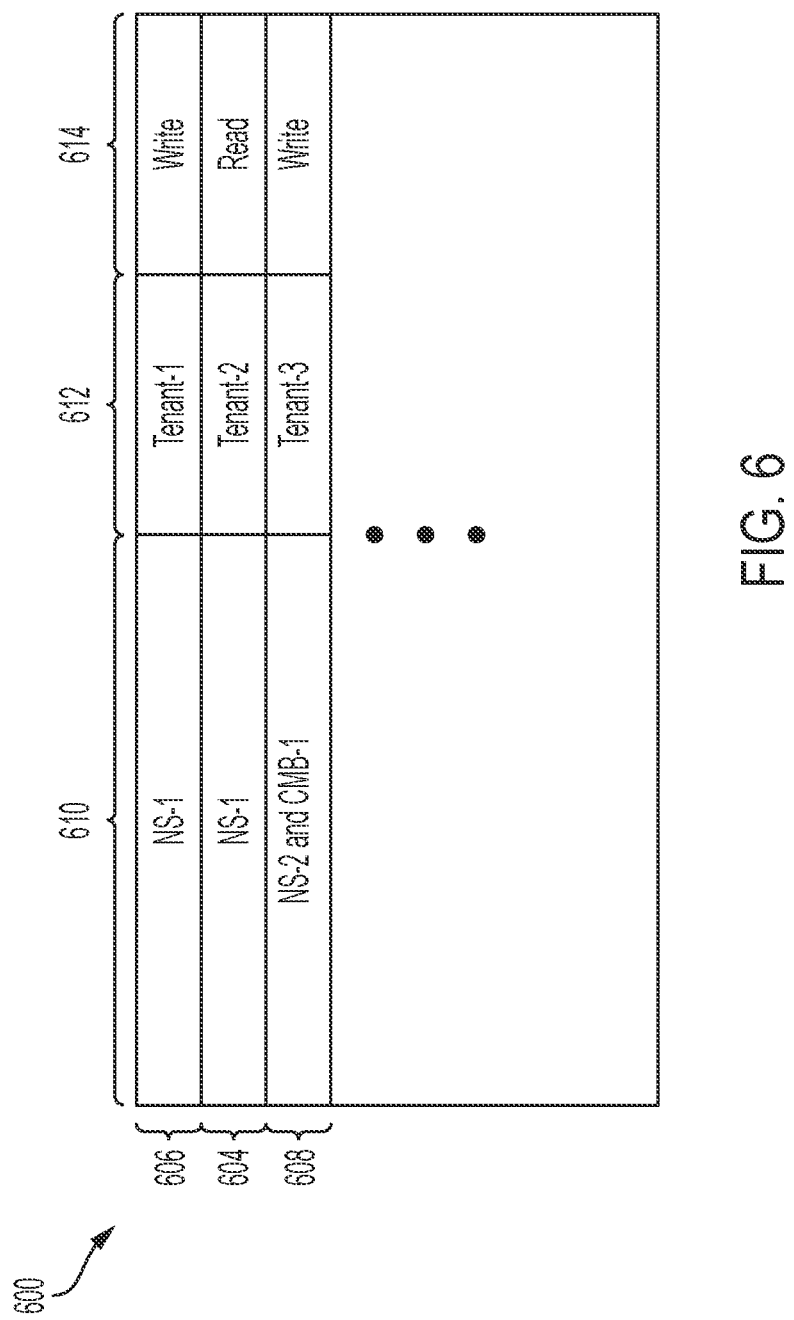
FIG. 6 depicts an example of a cache that may be used to manage resources of a storage device.

FIG. 6 illustrates an example of a cache 600 that may store resource unit reservation information. The cache 600 may correspond to one or more of a cache stored by the computing device 102, the first tenant 105, the second tenant 106, the accelerator 202 (e.g., in the accelerator memory 216, the host processor 218 (e.g., in the host memory 240), the CXL accelerator 302 (e.g., in the RAM 368), the CXL accelerator 402 (e.g., in the RAM 468), the SSD 506 (e.g., the cache 532), the GPU 501 (e.g., the cache 534), and the hypervisor 502 (e.g., the cache 536).

The illustrated cache 600 includes a first entry 606 (e.g., first cache line), a second entry 604 (e.g., second cache line), and a third entry 608 (e.g., third cache line). Different examples may have a different number of entries. Each entry 606, 604, 608 includes a first field 610, a second field 612, and a third field 614. Different examples may have a different number of fields per entry. The first entry 606 includes an identifier of a tenant with write access to a NS. The first field 610 of the first entry 606 identifies the NS as "NS-1," the second field 612 of the first entry 606 indicates that a "Tenant-1" has access to the NS-1, and the third field 614 of the first entry 606 indicates that the type of access is write access. The first entry 606 may be set in response to a reservation request (e.g., the first request 112, the second request 114, the reservation request 252, the arbitration resolution request 510, or the arbitration resolution request 512).

The second entry 604 describes if the tenant in cache line 1 is allowing other tenants to read this NS at this time. The first field 610 of the second entry 604 identifies the NS as "NS-1," the second field 612 of the second entry 604 indicates that a "Tenant-2" also has access to the NS-1, and the third field 614 of the second entry 604 indicates that the type of access is read access. A reservation request (e.g., the first request 112, the second request 114, the reservation request 252, the arbitration resolution request 510, or the arbitration resolution request 512) may indicate whether a second tenant can access a requested resource unit and what secondary access type is granted. Thus, the first entry 606, and the second entry 604 may be set in response to the same reservation request. Alternatively, the second entry 604 may be set in response to a second reservation request.

The third entry 608 includes an identifier of a tenant with full control over a resource unit that includes a CMB and computational resource unit grouped together. The first field 610 of the third entry includes an identifier indicating that a resource unit including "NS-2" and "CMB-1," the second field 612 of the third entry 608 indicates that "Tenant-3" has access to the resource unit, and the third field 614 of the third entry 608 indicates that the type of access is write. A storage device or accelerator may group the NS-2 and the CMB-1 into a resource unit in response to a grouping request (e.g., the grouping request 130 or a similar grouping request sent by the host processor 218, the hypervisor 502, or the GPU 501). The third entry 608 may be set in response to a reservation request (e.g., the first request 112, the second request 114, the reservation request 252, the arbitration resolution request 510, or the arbitration resolution request 512).

It should be noted that the cache 600 is provided as an illustrative example. In other examples, a cache may store encoded values rather than plain text values. For example, a value of 0000 may indicate that a resource unit is available, a value of FFFF may indicate that a resource unit is offline, a value of 1 may indicate that a resource unit is currently in use by tenant 1, a value of 0000 0001 may indicate that a resource unit is currently read only by tenant 1, a value of 0001 0001 may indicate that a resource unit is currently in read/write by tenant 1, etc.

Thus, FIG. 6 depicts a cache of resource unit reservations that may be managed on a managing protocol (e.g., CXL.mem or CXL.cache). The managing protocol may provide coherence of the cache with other caches at tenants. Accordingly, tenants may be able to quickly ascertain whether a storage device resource unit is available for access.

Referring to FIG. 7, a flowchart illustrating a method 700 is shown. The method 700 may be performed by a computing device, such as the computing device 102, the accelerator 202, the CXL accelerator 302, the CXL accelerator 402, a device including the accelerator logic 508 and the SSD 506, etc.

The method 700 includes sending, from a computing device, an enumeration of a resource unit of the computing device to a first computing system tenant and to a second computing system tenant, at 702. The enumeration is sent through a first protocol and indicates a managing protocol associated with managing the resource unit. For example, the computing device 102 may send the enumeration 110 to the first tenant 105 and the second tenant 106 through the first protocol 109 (e.g., CXL.io). The enumeration 110 identifies the resource unit 104 available at the storage device 103 and may further specify that the resource unit is managed on the second protocol 111 (e.g., a managing protocol). In some examples, the computing device 102 generates the resource unit 104 and sends the enumeration 110 in response to a grouping request, such as the grouping request 130. As another example, the accelerator 202 may send the enumeration 250 identifying an available resource unit at the NVMe SSD 206 to the processor core 226 and the processor core 228. The enumeration 250 may identify which protocol the resource unit is managed on (e.g., CXL.cache or CXL.mem). The resource unit may be generated and the enumeration 250 may be sent in response to a grouping request (e.g., similar to the grouping request 130) sent by the host processor 218 (e.g., by the processor core 226 or the processor core 228). As another example, the controller 362 may initiate transmission of an enumeration of a resource unit of the storage device 306 through the HIL 360 over CXL.io to one or more tenants. The enumeration may identify which protocol the resource unit is managed on (e.g., CXL.cache or CXL.mem). The resource unit may be generated and the enumeration may be sent in response to a grouping request (e.g., similar to the grouping request 130). As another example, the controller 462 may initiate transmission of an enumeration of a resource unit of the storage device 406 through the HIL 460 over CXL.io to one or more tenants. The enumeration may identify which protocol the resource unit is managed on (e.g., CXL.cache or CXL.mem). The resource unit may be generated and the enumeration may be sent in response to a grouping request (e.g., similar to the grouping request 130). As another example, the SSD 506 may transmit an enumeration of a resource unit (e.g., NS M) available at the SSD 506 through to the GPU 501 and the hypervisor 502 through CXL.io. The enumeration 250 may identify which protocol the resource unit is managed on (e.g., CXL.cache or CXL.mem). The resource unit may be generated and the enumeration may be sent in response to a grouping request (e.g., similar to the grouping request 130).

The method 700 further includes receiving, at the computing device, a first request from the first computing system tenant to reserve the resource unit, at 704. The first request is received through the managing protocol. For example, the computing device 102 may receive the first request 112 from the first tenant 105 through the second protocol 111 (e.g., the managing protocol specified by the enumeration 110). The first request 112 may request reservation of the resource unit 104. As another example, the accelerator logic 208 may receive the reservation request 252 through the CXL.cache link 212 (or the CXL.mem link 214). As another example, the accelerator logic 308 may receive a request for a resource unit of the storage device 306 through CXL.cache or CXL.mem. As another example, the accelerator logic 408 may receive a request for a resource unit of the storage device 406 through CXL.cache or CXL.mem. As another example, the accelerator logic 508 may receive the arbitration resolution request 510 through CXL.cache (or CXL.mem).

The method 700 further includes receiving, at the computing device, a second request from the second computing system tenant to reserve the resource unit, at 706. The second request received through the managing protocol. For example, the computing device 102 may receive the second request 114 from the first tenant 105 through the second protocol 111 (e.g., the managing protocol specified by the enumeration 110). The first request 112 may request reservation of the resource unit 104. As another example, the accelerator logic 208 may receive another reservation request through the CXL.cache link 212 (or the CXL.mem link 214) (e.g., from the second processor core 228). As another example, the accelerator logic 308 may receive a second request for a resource unit of the storage device 306 through CXL.cache or CXL.mem. As another example, the accelerator logic 408 may receive a second request for a resource unit of the storage device 406 through CXL.cache or CXL.mem. As another example, the accelerator logic 508 may receive the arbitration resolution request 512 through CXL.cache (or CXL.mem).

The method 700 further includes sending, from the computing device to the second computing system tenant, an indication that the resource unit is reserved by the first computing system tenant, at 708. The indication is sent through the managing protocol. For example, the computing device 102 may send the reservation indicator 116 (and to the first tenant 105 in some implementations) to the second tenant 106 through the second protocol 111. The reservation indicator 116 indicates that the first tenant 105 has access to the resource unit 104. The reservation indicator 116 may indicate a type of access granted to the first tenant 105. In some implementations, the reservation indicator 116 corresponds to a cache line (e.g., a line of the cache 600). As another example, the accelerator logic 208 may send the reservation announcement 254 over the CXL.cache link 212 (or the CXL.mem link 214) to the host processor 218 (e.g., to the second processor core 228). The reservation announcement 254 may correspond to a cache line (e.g., a line of a cache stored in the accelerator memory 216, such as the cache 600). As another example, the accelerator logic 308 may send a reservation announcement (e.g., a cache line, such as a line of the cache 600) through CXL.cache (or CXL.mem). As another example, the accelerator logic 408 may send a reservation announcement (e.g., a cache line, such as a line of the cache 600) through CXL.cache (or CXL.mem). As another example, the accelerator logic 508 may publish the cache line 530 to the GPU 501 and the hypervisor 502 over CXL.io (or CXL.mem).

In some examples, the computing device may select the first computing system tenant to receive access to the resource unit based on a time of arrival of the first request and the second request (e.g., first come first served). In other examples, the computing device may select the first computing system tenant to receive access to the resource unit based on a relative priority of the first tenant compared to the second tenant. To illustrate, the first tenant may be associated with a first priority that is higher than a second priority associated with the second tenant. In another example, the computing device may select the first computing system tenant to receive access to the resource unit based on an access policy/security policy associated with the resource unit. For example, a security policy may grant the first tenant access to the resource unit (or deny the second tenant access to the resource unit.

Once the first tenant is granted access to the resource unit, the first tenant may send access requests (e.g., NVMe requests) to the storage device over the first protocol (e.g., CXL.io).

Thus, the method 700 may be used to enumerate a resource unit through a first protocol and to distribute a reservation announcement through a second protocol. Because different protocols are used, enumeration messages may not block reservation messages. Further, the second protocol may be a cache coherent protocol, such as CXL.io or CXL.mem. Accordingly, knowledge of reservations may be coherent across a system implementing the method 700.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML, page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
sending, from a computing device, an enumeration of a resource unit of the computing device to a first computing system tenant and to a second computing system tenant, the enumeration sent through a first protocol associated with enumerating resources and indicating a managing protocol associated with managing the resource unit, the first protocol being a different protocol than the managing protocol;
receiving, at the computing device, a first request from the first computing system tenant to reserve the resource unit, the first request received through the managing protocol;
receiving, at the computing device, a second request from the second computing system tenant to reserve the resource unit, the second request received through the managing protocol; and
sending, from the computing device to the second computing system tenant, an indication that the resource unit is reserved by the first computing system tenant, the indication sent through the managing protocol.

2. The method of claim 1, further comprising, in response to receiving the first request, setting a marker in a memory space of the computing device accessible to the managing protocol, the marker indicating that the first computing system tenant has reserved the resource unit.

3. The method of claim 2, wherein the first protocol is a Compute Express Link (CXL) protocol comprising a CXL.io protocol, and wherein the managing protocol is a CXL.cache protocol or a CXL.mem protocol.

4. The method of claim 2, wherein the marker further indicates that the second computing system tenant has limited access to the resource unit.

5. The method of claim 4, wherein the marker comprises a cache line in a cache of the computing device, and wherein sending the indication that the resource unit is reserved by the first computing system tenant includes sending the cache line.

6. The method of claim 1, further comprising concurrently processing, at the computing device, a message received through the first protocol and a message received through the managing protocol.

7. The method of claim 1, further comprising receiving, at the computing device, a request to group a first resource with a second resource, wherein the enumeration is generated based on the request to group the first resource with the second resource, and wherein the resource unit includes the first resource and the second resource.

8. A computing device comprising:
a storage device; and
a processing unit, wherein the storage device is configured to:
send an enumeration of a resource unit of the storage device to a first computing system tenant and to a second computing system tenant, the enumeration sent through a first protocol associated with enumerating resources and indicating a managing protocol associated with managing the resource unit, the first protocol being a different protocol than the managing protocol, and wherein the processing unit is configured to:
receive a first request from the first computing system tenant to reserve the resource unit, the first request received through the managing protocol;
receive a second request from the second computing system tenant to reserve the resource unit, the second request received through the managing protocol; and
send, to the second computing system tenant, an indication that the resource unit is reserved by the first computing system tenant, the indication sent through the managing protocol.

9. The device of claim 8, further comprising a memory, wherein the processing unit is further configured to, in response to receiving the first request, set a marker in the memory, the marker indicating that the first computing system tenant has reserved the resource unit.

10. The device of claim 9, wherein the first protocol is a Compute Express Link (CXL) protocol comprising a CXL.io protocol, and wherein the managing protocol is a CXL.cache protocol or a CXL.mem protocol.

11. The device of claim 9, wherein the processing unit is configured to reserve the resource unit to the first computing system tenant based on a first time of arrival of the first request relative to a second time of arrival of the second request.

12. The device of claim 8, wherein the storage device is further configured to receive a request to group a first resource with a second resource, wherein the enumeration is generated based on the request to group the first resource with the second resource, and wherein the resource unit includes the first resource and the second resource.

13. The device of claim 8, wherein the processing unit includes a field programmable gate array, an application specific integrated circuit, or a combination thereof.

14. The device of claim 8, wherein the storage device includes a controller, and wherein the processing unit is an element of the controller.

15. A system comprising:
a host processor including a first tenant and a second tenant; and
a device including:
a storage device; and
a processing unit, wherein the storage device is configured to:
send an enumeration of a resource unit of the storage device to the first tenant and to the second tenant, the enumeration sent through a first protocol associated with enumerating resources and indicating a managing protocol associated with managing the resource unit, the first protocol being a different protocol than the managing protocol, and
wherein the first tenant is configured to:
send a first request to reserve the resource unit to the processing unit through the managing protocol;
wherein the second tenant is configured to:
send a second request to reserve the resource unit to the process unit through the managing protocol;
wherein the processing unit is configured to:
receive the first request;
receive the second request; and
send, to the second tenant, an indication that the resource unit is reserved by the first tenant, the indication sent through the managing protocol.

16. The system of claim 15, wherein the first tenant includes a component of the host processor, software executable by the host processor, or a combination thereof.

17. The system of claim 15, wherein the first tenant includes a graphics processor unit (GPU).

18. The system of claim 15, wherein the first tenant includes a hypervisor provided by the host processor.

19. The system of claim 15, wherein the storage device includes a computational storage device.

20. The system of claim 15, wherein the device further includes a memory, and wherein the processing unit is further configured to maintain a cache, in the memory, of resource unit reservations, and wherein the indication that the resource unit is reserved by the first tenant comprises a line of the cache.

* * * * *